Jan. 3, 1928.
H. S. CHRISTOPHERSEN
1,655,132
ALARM DEVICE FOR ACOUSTIC INDICATION OF AIR DEFICIENCY
IN PNEUMATIC TIRES, ESPECIALLY FOR AUTOMOBILES
Filed Nov. 11, 1925
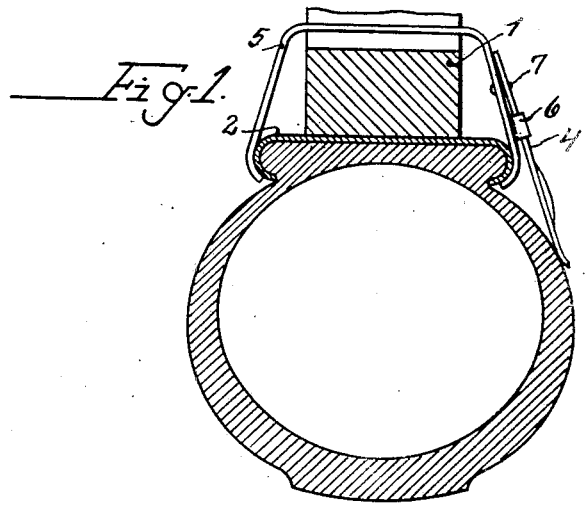
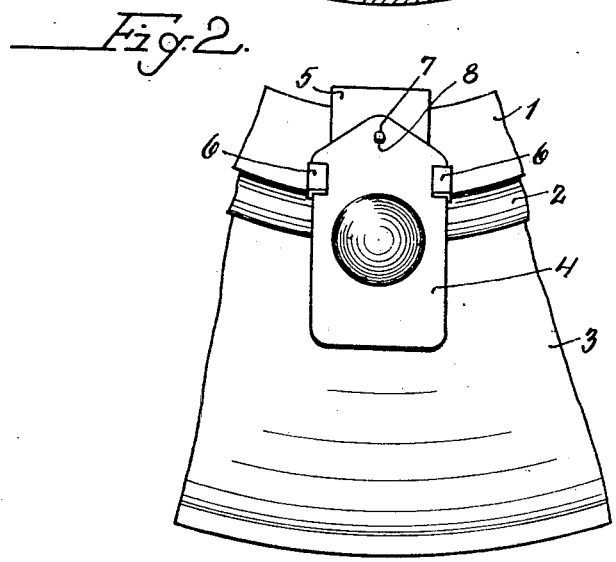
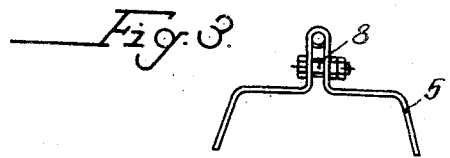
Inventor.
Hagbart Sylvester Christophersen
per
Attorney.

Patented Jan. 3, 1928.

1,655,132

UNITED STATES PATENT OFFICE.

HAGBART SYLVESTER CHRISTOPHERSEN, OF ODENSE, DENMARK.

ALARM DEVICE FOR ACOUSTIC INDICATION OF AIR DEFICIENCY IN PNEUMATIC TIRES, ESPECIALLY FOR AUTOMOBILES.

Application filed November 11, 1925, Serial No. 68,333, and in Denmark December 12, 1924.

Apparatuses are known by means of which during automobile driving announcement is made in time of casual injury to the pneumatic tires resulting in slow escape of the air, in such a manner that an opportunity is given to stop the carriage and remedy the defect before the pneumatic tire has been injured by running without sufficient air pressure. An apparatus of this nature is based on the use of a tongue-shaped metal plate having a dint, which plate is disposed in a holder outside of one of the sides of the wheel in such a manner that the said plate presses lightly against the pumped tire. The effect is then that the ring, if owing to deficiency of air it flattens too much sideways, will push the resilient metal plate sideways and, at the next moment release it again, so that it will return to its normal position owing to its own resiliency. Hereby, as it is well known, a plate of this nature will produce a cracking sound which is sufficiently strong to be noticed by the driver of the carriage.

The present invention relates to an apparatus in which such a sound producing plate is used.

One construction of the invention is illustrated on the drawing,

Figs. 1 and 2 showing in cross-section and side elevation, respectively, a felloe and tire with the holder in position and a sound-producing metal tongue attached thereto, Fig. 3 in end elevation, a modified construction of the holder.

Referring to the drawing, 1 is the wooden part of the felloe and 2 the metal part attached to the outer side of the latter and supporting the wheel tire 3. 4 is the tongue-shaped and at its centre slightly arched metal plate which is preferably made of steel and forms the above mentioned sound producer, and 5 is the holder. The latter may be a clip made of spring steel or some similar resilient material, and is held in position solely by its own resiliency, or it may be a bow made from other suitable material and secured to the felloe by suitable means of attachment, for instance by a screw 8 as shown in Fig. 3. The holder 5 is fitted at bottom with two flaps 6 reaching slightly over the sound-producer 4 and, nearer to the centre of the wheel, with a pin 7 passing through a corresponding hole 8 in the sound-producer. The latter may thus easily be placed in position on the holder by being inserted between the two bent flaps 6, whereby it will slip down, automatically, over the pin 7 and thereby become locked in position. The clip 5 may easily by hand be forced so far away from the felloe that it may thereby be removed, and with the same ease it may be placed anywhere on the felloe. The flaps 6 are suitably made from slightly softer steel than the clip 5, so that they may be bent slightly towards the outside and, thereby, to some extent adjusted to suit the thickness of the tire 3. The pin 7 may be replaced by a split pin or the like passing through the sound-producer and the adjoining flap of the clip.

It is unnecessary, when the holder is to be attached to the wheel, first to slip the air out from the tire, and the holder will remain in position, even in the event of an explosion of outer and inner tube while driving. As now, furthermore, the holder is so easy to attach and detach by hand only four such apparatuses will be required for securing an automobile completely, viz, one for every running wheel, but none for the spare wheel or wheels. In case of a wheel failing, so that it must be replaced by another one, the holder may very easily be shifted over to the latter. Further, it is an easy matter from time to time to move the holder, with the sound-producer attached, in peripheral direction on the wheel, in order to prevent the latter from being worn at one and the same point by the metallic sound-producer resting against the pneumatic tire. This drawback is present in all heretofore known devices of this nature.

Having now particularly described and ascertained the nature of my said invention and in what manner the same is to be performed, I declare that what I claim is:

An alarm device for giving audible warning of deficiency of air in pneumatic tires comprising a removable resilient metal clamp encircling the felloe of the wheel in a radial direction and firmly gripping around the metallic edges of the said felloe, a pair of projecting flaps on the clamp, a pin on the clamp above said flaps, and a resilient slightly arched metal tongue positioned beneath said flaps and mounted on said pin so that said tongue is removably attached to said clamp and arranged to project within the field of expansion of the tire, the said clamp being held in proper position on the felloe solely by its own resiliency.

HAGBART SYLVESTER CHRISTOPHERSEN.